US011858014B2

(12) United States Patent
Perdomo

(10) Patent No.: US 11,858,014 B2
(45) Date of Patent: Jan. 2, 2024

(54) METHOD AND SYSTEM FOR CONTROLLING MARINE GROWTH USING COMPLEX ULTRASONIC WAVEFORMS

(71) Applicant: Isabela V. Perdomo, Miami Beach, FL (US)

(72) Inventor: Isabela V. Perdomo, Miami Beach, FL (US)

( * ) Notice: Subject to any disclaimer, the term of this patent is extended or adjusted under 35 U.S.C. 154(b) by 0 days.

(21) Appl. No.: 18/104,668

(22) Filed: Feb. 1, 2023

(65) Prior Publication Data

US 2023/0173553 A1 Jun. 8, 2023

Related U.S. Application Data

(62) Division of application No. 16/748,856, filed on Jan. 22, 2020, now Pat. No. 11,583,900.

(60) Provisional application No. 62/795,752, filed on Jan. 23, 2019.

(51) Int. Cl.

| | |
|---|---|
| ***B08B 3/12*** | (2006.01) |
| ***B06B 1/02*** | (2006.01) |
| ***B63B 59/08*** | (2006.01) |
| ***B63B 59/04*** | (2006.01) |

(52) U.S. Cl.

CPC .............. *B08B 3/12* (2013.01); *B06B 1/0276* (2013.01); *B63B 59/08* (2013.01); *B06B 2201/74* (2013.01); *B63B 59/04* (2013.01)

(58) Field of Classification Search

None

See application file for complete search history.

(56) References Cited

U.S. PATENT DOCUMENTS

2017/0128857 A1* 5/2017 Lipkens ................ B01D 43/00
2019/0135389 A1* 5/2019 DiLorenzo ............. B08B 7/026

FOREIGN PATENT DOCUMENTS

GB 2496397 A * 5/2013 ............ B63B 59/04
GB 2496397 A 5/2013
WO WO 2006/045161 5/2013

OTHER PUBLICATIONS

Raspberry Pi 3 Model B+—reaspberrypi.org (5 pgs).

(Continued)

*Primary Examiner* — Nicole Blan

(74) *Attorney, Agent, or Firm* — Robert C. Kain, Jr.; Scott D. Smiley; The Concept Law Group, P.A.

(57) ABSTRACT

The method and system uses ultrasound (US) transducers in contact with an inboard surface underwater portions of marine vessels or structures. By first digitally generating disruptive, multi-frequency, interfering US waveform signals (complex waveforms, typically replicating a Bessel function) and then converting the signals into analog, the transducers generate disruptive, multi-frequency, interfering US waveforms through the underwater portions of the marine vessels and structures which waveforms disrupt unwanted marine growth on the water-side of the vessel or structure. The digital signals, and also the analog signals, are complex waveform signals, typically produced with a Bessel function. The US transducers are either circular membrane transducers or surface transducers. A computer processor coupled to a memory, generates the complex waveform signals fed to the US transducers.

5 Claims, 2 Drawing Sheets

(56) References Cited

OTHER PUBLICATIONS

2 Channel Electronic Untrasonic Antifouling Unit System Protect Boart Marine Hull—eBay—www.ebay.com.au/itm/2-channel-electronic-ultrasonic-antifouling-unit-system . . . (5 pgs).
4 Channel Electronic Anitfouling Unit for Boats-Soanar - www.soanar.com/store/category/1/product/ys5602.aspx (2 pgs).
Choosing the Best Ultrasonic Frequency—Zenith Ultrasonics—www.zenith-ultrasonics.com/ultrasonic_frequency_selection.html (2 pgs).

* cited by examiner

METHOD AND SYSTEM FOR CONTROLLING MARINE GROWTH USING COMPLEX ULTRASONIC WAVEFORMS

This is a divisional patent application based upon and claiming the benefit of patent application Ser. No. 16/748,856, filed Jan. 22, 2020, and provisional patent application Ser. No. 62/795,752, filed Jan. 23, 2019, the contents of which is incorporated herein by reference thereto.

The present invention relates to a method and a system for controlling marine growth using complex ultrasonic waveforms.

BACKGROUND OF THE INVENTION

There is a need for an improved method and system to control marine growth on vessel hulls and other surfaces subjected to marine and algae growth in water environments. There is a need to find more efficient and cost-effective ways to prevent barnacle growth on marine vessels than offered by the current technology. Anti-fouling paints control marine growth but are made of toxic materials that are detrimental to the environment. Further this heavy coat of anti-fouling paint adds extra weight to the boat causing more drag which in turn burns more fuel which further deteriorates the environment.

One prior art device, a SOANAR Ultrasonic Antifouling System, produces a repeating single frequency square wave pulse/burst which is produced by the output of a single binary pin of a computer circuit toggling between logical zero and one repeatedly. This prior art system generates an ultrasonic (US) waveform to reduce biofouling with an ultra-sonic speaker, also known as a piezo electric (PE) speaker. The PE speaker produces a high frequency sound which is not audible by humans. The SOANAR prior art device emits a single frequency, ultrasonic sound wave. The US burst can be represented by a square wave output burst. The SOANAR system may use several ultrasonic transducers driven by a single controller. The SOANAR system generates a repeating single frequency square wave pulse or burst.

An investigation of other prior art US cleaning systems, such as for jewelry, revealed that different frequencies have different cleaning effects but still have the same quantitative effect on the dirty surface. Two very different US frequencies result in the same amount of surface cleaning but there is a different amount of cavitation-based bubbles of different sizes. The lower US frequency cleaned the immediate area strongly but didn't cover as much area because of the degradation effect. With a higher frequency, the cavitation bubbles are smaller, but they also cover a larger area resulting in a more even clean than the lower frequency.

Some prior art systems apply multiple US frequencies to the surface to be cleaned by using multiple speakers or transducers, each supplied with a different frequency. While these multi-transducer systems solve the one frequency problem, a problem arises in that each transducer is driven by a different US generator requiring more power. Also, although one transducer can generate a pattern of multiple frequencies, these multiple frequencies are not emitted at the same time by the same transducer.

Objects of the Present Invention

It is an object of the present invention to provide an improved US system to reduce marine growth on vessels and other structures in an underwater marine environment.

It is a further object of the present invention to deploy over a vessel hull, along an inboard hull surface, a number of US transducers that produce disruptive, multi-frequency, interfering waveforms which US waveforms inhibit marine growth on the vessel hull or the exposed, underwater surface of the structure.

It is an additional object of the present invention to provide a computer-based system which can be programmed to generate the disruptive, multi-frequency, interfering waveforms, for example, to generate complex waveforms based upon a Bessel function, and apply those complex waveforms to one or more US transducers.

It is another object of the present invention to provide a US anti-fouling system which can be integrated into the vessel's navigational computer system or the vessel's entertainment system due to the US driver/controller configured as a small computer board.

BRIEF DESCRIPTION OF THE DRAWINGS

Further objects and advantages of the present invention can be found in the detailed description that follows when taken in conjunction with the accompanying drawings.

SUMMARY

The method of reducing marine growth on underwater portions of marine vessels hulls and vibratory sensitive underwater structures includes providing a plurality of ultrasound (US) transducers in contact with an inboard surface the underwater portions of marine vessels and structures. The inboard surface these underwater portions of marine vessels and vibratory sensitive structures must be able to transmit US waveforms therethrough. The method digitally generates disruptive, multi-frequency, interfering US waveform signals, then converts the digital signals into analog signals and then applies the analog signals to the US transducers. As a result, the transducers generate disruptive, multi-frequency, interfering US waveforms through the underwater portions of the marine vessels and structures which US waveforms disrupt unwanted marine growth on the vessel or structure. The digital signals, and also the analog signals, are complex waveform signals, typically produced with a Bessel function. The US transducers are either circular membrane transducers or surface transducers.

The system for reducing or controlling marine growth includes a computer processor coupled to a memory store. The processor and memory digitally generate disruptive, multi-frequency, interfering US waveform signals which are applied to a digital to analog converter to obtain representative analog signals. A plurality of ultrasound (US) transducers are disposed inboard of the underwater portions of marine vessels or structures. The analog signals are applied to the US transducers. As a result, the US transducers generate disruptive, multi-frequency, interfering US waveforms through the underwater portions of the marine vessels or structures.

DETAILED DESCRIPTION OF EMBODIMENTS OF THE INVENTION

The present invention relates to a method and a system for controlling marine growth using complex ultrasonic waveforms.

Figure 1:
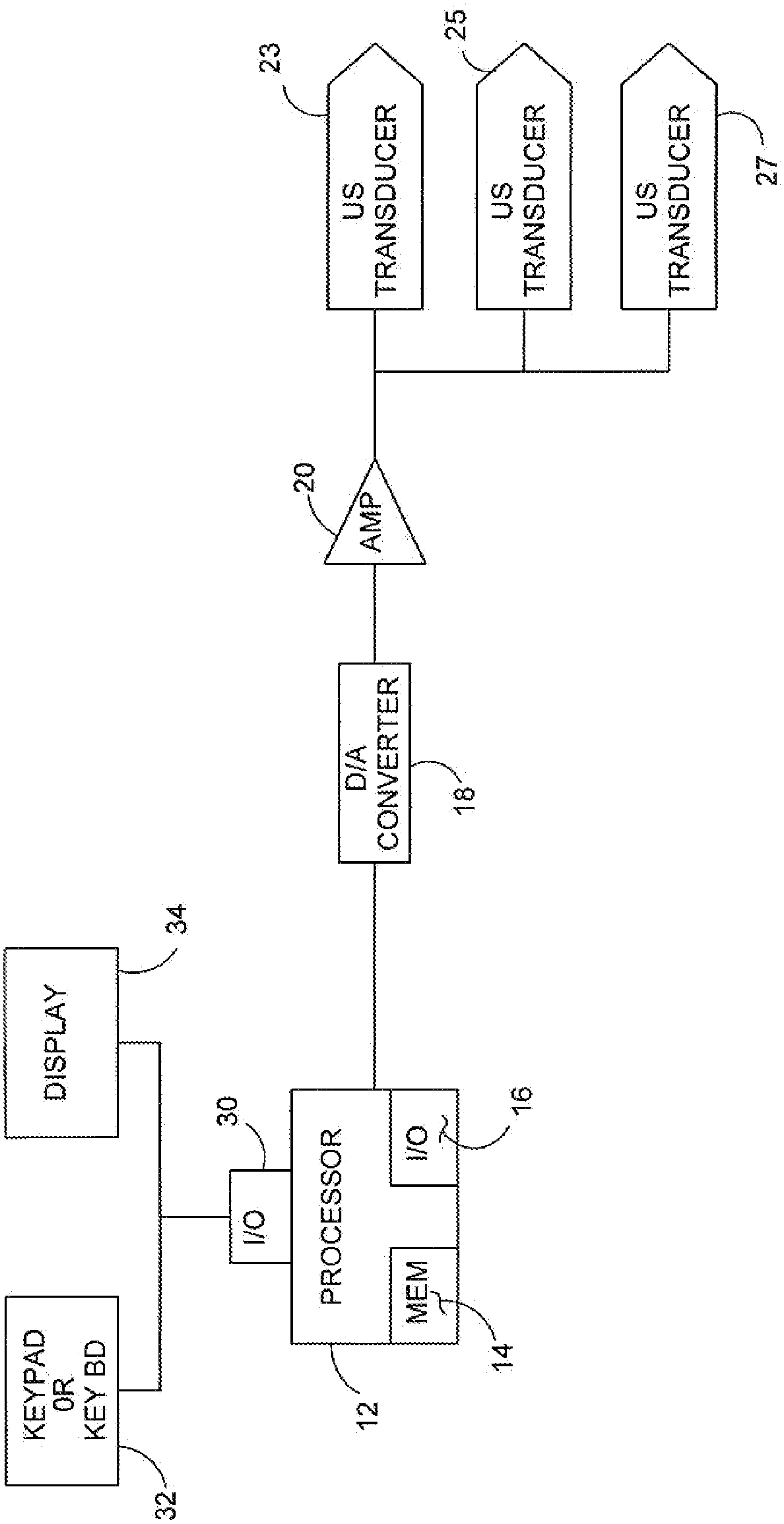
FIG. 1 diagrammatically illustrates a functional schematic of the complex US waveform generation system, driving US transducers.

FIG. 1 diagrammatically illustrates the driver-processor for the complex US waveform generator and several US transducers. In a preferred embodiment, the driver-processor includes processor 12, memory 14, and input-output (I/O) module 16. The output from processor 12 is applied to digital-analog (D/A) converter 18. The output of the D/A converter 18 is applied to an amplifier 20. Several amplifiers may be needed dependent upon the number of US transducers. The output of amplifier 20 is applied to one or more US transducers, 23, 25 and 27. Input is provided to processor 12 and memory 14 via a keypad or keyboard 32. A display 34 permits the user to visually interact with processor 12 and memory 14. Keypad 32 and display 34 is coupled to I/O 30. In one embodiment, the processor 12, memory 14, D/A converter 18, and amplifier 20 may be located on a single computer board. Keypad 32 and display 34 may be any electronically coupled input and output device used in connection with computer systems.

Figure 2:
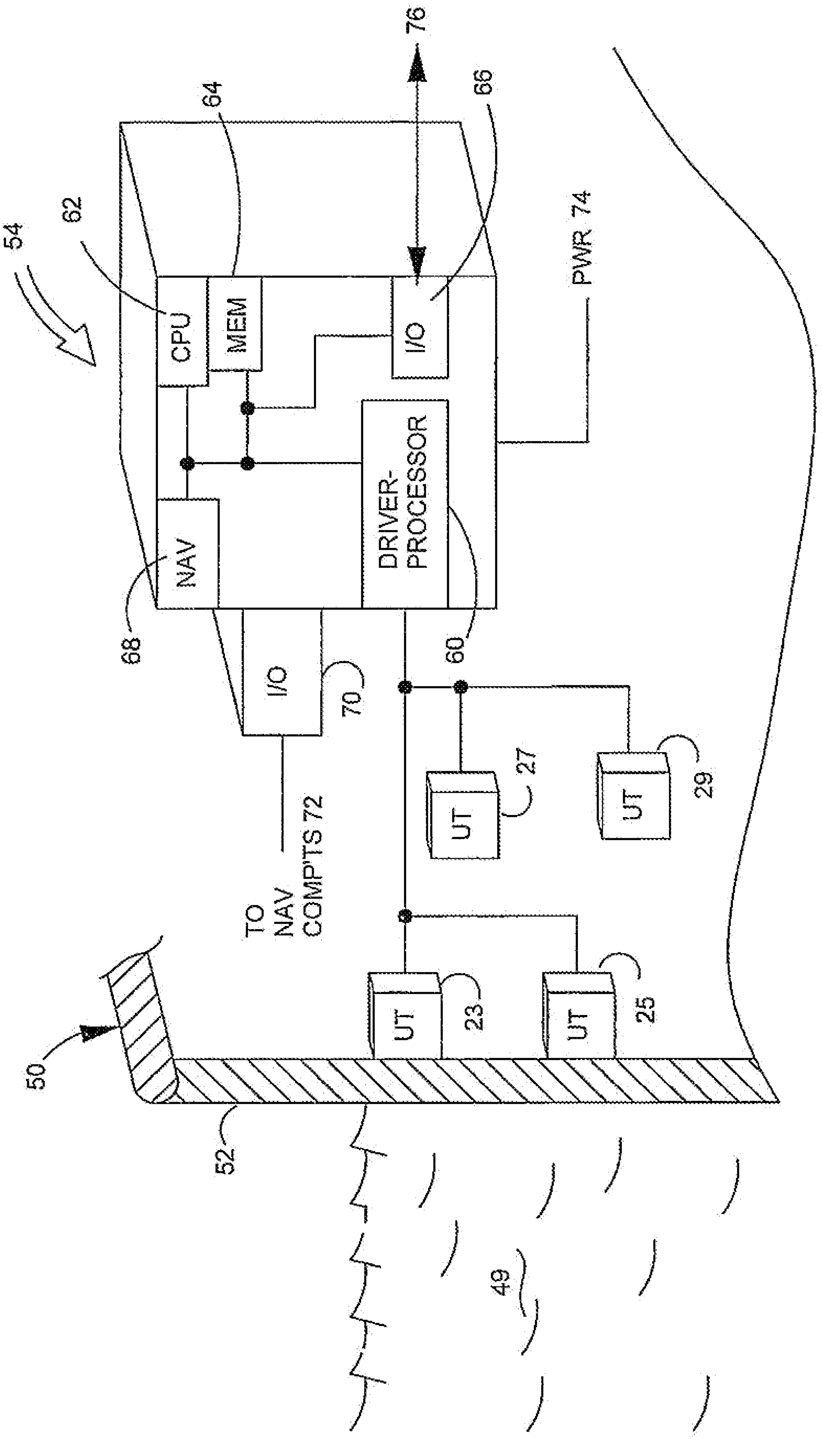
FIG. 2 diagrammatically illustrates the deployment of multiple US transducers on an inboard side of a vessel hull, which US system reduces marine growth on the underwater-side of the hull. Discussions herein relating to the use of the US system on a vessel apply equally to a structure having a vibratory sensitive underwater surface subjected to marine growth.

FIG. 2 diagrammatically illustrates a portion of a vessel or structure, subject to marine growth due to the maritime environment 49, and also illustrates a number of US transducers (UT) coupled to the driver-processor 60 mounted in a computer cabinet housing computer system 54. Hull segment or vibratory sensitive underwater structure 52 represents underwater portions of marine vessels hulls and underwater portions of vibratory sensitive structures. These underwater portions of vibratory sensitive structures must be able to transmit US waveforms, in a generally similar manner as the hull of a vessel. UTs 23, 25, 27, 29 are disposed inboard the vessel or the structure in order to permit transmission of the US waveforms therethrough.

Computer system 54 includes a central processing unit, CPU 62, and other computer components. As discussed below, driver-processor-computer 60 is, in one embodiment, a Raspberry Pi board-mounted computer. The compact circuit board computer 60 is connected to the main bus 77 of computer system 54. As is known in the computer industry, circuit boards are typically slid into complementary slots in the computer box or enclosure. Other computer boards in the computer system 54 carry CPU 62 and memory 64. I/O board 66 is typically mounted in a different slot in the computer enclosure. I/O 66 communicates with other external devices 76. Power is supplied to computer system 54 by power system 74. The vessel may include a navigation (NAV) system. The navigation module 68 may be disposed in computer system 54. The NAV system has an I/O module 70 coupled to other navigational components 72 such as radar detectors, sonar detectors and other antennas.

To better disrupt marine growth on hull 52, the invention produces US signals other than square waves. To achieve this, one embodiment of the invention uses a digital to analog converter (D-A 18) attached to the Raspberry Pi controller/driver (processor 12, memory 14). The Raspberry Pi is a low cost, credit-card sized computer which can be programmed similar to processor 12 using programs stored in memory 14. The output of the computer processor 12 is applied to a high speed digital to analog (D/A) converter 18 (for example, an MCP4921) which converts the digital signal from the computer processor to an analog counterpart.

In an enhanced embodiment, the D/A conversion is part of the US transducers. In any event, analog electrical signals are applied to the circular membrane or surface transducers. In other embodiments, the D/A converter is a distinct module.

In one embodiment, the controller/driver/processor 12 generates a selected pattern of twelve binary values which are applied to D/A converter 18 which in turn produces an analog output with a resolution of 4,096 points. The D/A converter 18 allows the system to reproduce far more complex wave shapes than the prior art square wave generator. In addition, the D/A converter in the present embodiment can operate at a high enough sampling rate to properly reproduce ultrasonic frequencies. In one embodiment, a complex Bessel waveform is generated by the computer processor 12 and D/A converter 18. The digitally generating disruptive, multi-frequency, interfering US waveform signals replicate a Bessel function stored in the memory 14 and the signals are generated by processor 12. The selected Bessel function is downloaded or coded into memory 14.

In one embodiment, the complex US waveform generated by processor 12 was modeled via software using a Bessel mathematical function. The Bessel function, also called the Cylinder Function, is any of a set of mathematical functions systematically derived around 1817 by the German astronomer Friedrich Wilhelm Bessel.

One of the several core concepts in the present invention is the use of a disruptive ultrasound (US) generation system where multiple frequencies are emitted at the same time that interfere both constructively and destructively to create a complex-US waveform applied to the vessel hull. Such complex waveforms are best expressed by Bessel functions. Other complex waveforms may be used provided that the US waveforms have disruptive, multi-frequency, interfering waveforms. The interference is both constructive and destructive in nature.

An investigation has shown that effective, anti-fouling US waveforms (ultrasonic or ultrasound waveforms) should be complex (not simple sine waves or square waves); have a composite frequency spectrum about 20 kHz otherwise in an (ultrasonic range); and generate vibrations produced by a circular membrane or surface (like a drum or cymbal). As an example, a circular SOANAR transducer was used in the tests described below. These SOANAR transducers were driven by electrical signals representing a Bessel function. Other circular membrane/surface transducers could be used.

Investigations used three basic empirical steps to develop the desired complex (Bessel) enhanced marine growth control waveforms. First, recordings were made of instruments that make use of a vibrating membrane (drums). Second, the recordings were frequency shifted from the human audible range to the ultrasonic range above 20 khz using sound editing software (see AUDACITY software). This frequency shifting was accomplished by speeding up the recording, similar to running a tape recording at a higher speed than originally recorded. Third, the frequency shifted recordings were combined to cause the most disturbance as empirically observed using a "Disturbance Observation Apparatus (DOA)".

The DOA enabled a visual evaluation of the impact of a waveform on a test surface. The DOA apparatus included a closed top, generally square Plexiglass container to which was attached the US transducer. A number of plastic beads are inserted into the Plexiglass container. In addition, the container is filled with sea water to allow for a better simulation of the effectiveness of the waveform under test and observation and its effectiveness to create disturbance patterns on the beads submerged in the sea water. The container was temporarily sealed to prevent the beads and water from escaping. The DOA established an empirical gauge of the effectiveness of applied ultrasonic waveforms permitting observation of the disturbed, water-bound plastic beads. The observed empirical results guided the design of new US waveforms. Thereafter, the effectiveness of different US waveforms, compared to prior art waveforms, was the subject of long-term sea trials.

The present invention discovered the benefits of different frequencies and the use of a succession of multiple frequencies ranging from lower ultrasonic to higher micro-sonic frequency to efficiently remove populations of particles that vary widely in size. The complex Bessel function US waveform method makes use of multiple frequencies by generating a more complex and random pattern as produced by prior art vibrating circular membranes. The effectiveness and superiority of these complex waveforms over the current state of the art as anti-fouling technique was studied.

Prior art studies have shown that higher US frequencies have a more evenly distributed cleaning effect whereas lower US frequencies have a less evenly distributed cleaning effect. Lower frequencies are usually better cleaning surfaces with large, highly-bonded contaminants. Higher US frequencies are better for thinner and more detailed contaminants or contaminants that have already been disrupted or damaged by other US cleaning systems.

Testing of Bessel function-based US waveforms in a marine setting were conducted comparing a prior art US anti-fouling system (a SOANAR System) to the Bessel function based US system to control boat hull marine growth by inhibiting more bio-fouling. Tests were conducted on surfaces with and without anti-fouling paint. The weight of marine growth was measured. The tests were designed to maintain: hull sample surface size and material (fiberglass rectangles); time in a typical marine underwater environment; submersion location; and, the presence or absence of anti-fouling paint.

Sample surfaces were weighed, placed in the marine environment, and extracted after one (1) month. The sample surfaces were then re-weighed to determine the sample-to-sample, one month marine growth. The results of these tests are set forth below.

A three-month trial was conducted for the purpose of measuring barnacle growth or lack thereof using the Bassel-function US system compared to the prior art SOANAR Ultrasonic Antifouling System. Four fiberglass samples were weighed and then submerged undisturbed for the duration of the one (1) month time period for each trial. Observations confirmed that barnacle growth was consistent on all of the submerged specimen surfaces. Upon removal of specimens, the fiberglass samples were once again weighed. The delta of weight increase noted is from initial submersion to removal from ocean water after a 1-month period. Trials 2 and 3 were conducted after the initial 1-month period. The control (CTRL) surface was unpainted and not impacted with US waveforms. The painted, anti-fouling control (CTRL-AFP) surface also not impacted with US waveforms.

TABLE 1

| First Trial | | | |
|---|---|---|---|
| Sample | Initial weight (g.) | Final weight (g.) | Change |
| SOANAR | 667.43 | 685.33 | 18% |
| Bessel | 661.21 | 674.78 | 14% |
| CTRL | 108.17 | 137.61 | 29% |
| CTRL-AFP | 96.5 | 110.04 | 14% |

TABLE 2

| Second Trial | | | |
|---|---|---|---|
| Sample | Initial weight (g.) | Final weight (g.) | Change |
| SOANAR | 664.46 | 684.13 | 20% |
| Bessel | 665.74 | 680.54 | 15% |
| CTRL | 84.63 | 120.16 | 36% |
| CTRL-AFP | 80.14 | 93.98 | 14% |

TABLE 3

| Third Trial | | | |
|---|---|---|---|
| Sample | Initial weight (g.) | Final weight (g.) | Change |
| SOANAR | 664.46 | 684.13 | 22% |
| Bessel | 665.74 | 680.54 | 16% |
| CTRL | 84.63 | 120.16 | 27% |
| CTRL-AFP | 80.14 | 93.98 | 16% |

A statistical analysis of the results, using a Kruskal-Wallis analysis, shows that there is a statistically significant difference (p-value of 0.05) between the prior art SOANAR device and the complex Bessel function US system.

The investigation reveals that the Bessel-based US transducer system better controls marine growth with the application of complex ultrasonic waveforms and eliminates or reduces barnacle growth compared to the prior art SOANAR US Antifouling System. Test results indicate that the Bessel function US waveforms outperform the SOANAR system and inhibit marine growth by about 25%. Studies show that the Bessel-based US waveform system inhibits marine or barnacle growth because the Bessel Function causes a greater disturbance over the hull surface samples and affects different species of marine growth at different rates ultimately covering more species than the SOANAR system.

As a result, the use of the Bessel-based US waveform system or similar complex US waveform systems (with disruptive, multi-frequency, interfering waveforms) replace the use of anti-fouling paint and, as a further result, reduce the introduction of potentially harmful anti-fouling paint chemicals into the sea and marine life.

With the use of a compact, slide-in computer board (creating the complex US waveforms and driving the US transducers), the US anti-fouling system can be expanded in several ways. First, the use of small, computer processor boards with programmable memory stores enables the generation of several different waveforms. For example, the Raspberry Pi board can be programed to generate many different digital waveforms which are then converted to analog US waves.

Second, if multiple studies were conducted using the pre-set or initial Bessel complex waveform system throughout the U.S. and over the world at certain geographic locations, and the geo-location or GPS data was marine growth data was collected for these studies, this geo-specific growth vs complex waveform data can be used to improve the performance of the complex wave generation system at different marine locations.

Third, the present inventive system and method can be employed and integrated into the following vessel-related systems. The system fully integrates with existing electronic subsystems that are commonly available on marine vessels. (1) The complex US waveform system connects to existing vessel computer-based GPS systems because the computer-processor board slides into a slot in the vessel's computer IT system. The Raspberry Pi controller/driver/processor is designed to be an insertable board in common computer IT systems. (2) Raspberry Pi controller/driver/processor system can be re-purposed or have a dual purpose as an amplifier for the vessel's media/audio system. (3) The Raspberry Pi controller/driver/processor computer board can be used to produce complex waveforms can be re-purposed as the vessel's multimedia communication system and fish finding apparatus providing but not limited to: (a) entertainment audio and video capabilities; (b) Internet access/network routing; (c) GPS and chatting, navigation software; (d) fish finding apparatus; and (e) depth finder. The complex waveform functionality on the Raspberry Pi controller/driver/processor computer board only needs to be enabled once vessel is docked/stored. While vessel is in use, the system provides the above-noted, alternate functionalities.

As for potential adverse effects of the complex US waveform system on marine life, an analysis reveals a relatively low risk to the marine environment. First, the complex waveform US system uses very low powered UTS (Ultrasonic Transducers). The maximum output power (assuming 100% efficiency) of the UTS in the complex US waveform system is generally defined by Ohm's Law wherein the output power in watts is defined by the equation P=VI where V and I are, respectively, the volts V across the load (the Piezo Electric Speaker, "PES") and the current I through the same UT speaker. Ohm's Law states that V=IR with output voltage V and resultant current I across the load (in this case the PIEZO speaker). The PES has a rated resistance of 8 Ohms above 20 Khz. Using the two equations, P=V*V/R or P=Vˆ/R where R is 8 Ohms. Given from experimental observation that the maximum amplitude of the ultrasonic waveform presented to the PES is about 10 V, the output power is P=Vˆ/8 or P=10ˆ/8=12.5 watts.

Also, the amplitude of the US waveforms degrade exponentially based upon the distance from the UT vibratory outputs. The power of the US waveforms degrades as the distance from marine vessel increases. An analysis was conducted to determine how the US signal diminishes as the distance from the UT generating source is increased. The experiment used a PIEZO speaker attached to a sample of fiberglass in a container filled with sea water. As expected, the amplitude of the US signal generally exponentially decayed based upon the distance between the UT transmitter and the UT receiver. After about 38 cm, the signal is significantly attenuated. Also, the complex waveform system and method use much lower frequencies than typical fish finder systems. The typical power output of depth/fish finders is usually at least 600 watts and very commonly exceeds 1000 watts. The current complex waveform system produces about 12.5 watts. Hence, the sonic power in the present complex waveform system is about 100 times smaller than the power commonly used in the industry as depth or fish finder systems.

Since the present complex US waveform system is used dockside, the amount of marine life exposed to the ultrasonic waveforms is limited to within one (1) meter of the vessel's docked location. As for marine plan life, during photosynthesis, the plants produce waveforms in the ultrasonic range. Since the plant-produced waveforms are in the ultrasonic range, introducing similar waveforms to the plants' environment most likely would not adversely effect plant life.

The claims upended hereto are meant to cover modifications an changes within the scope of the invention.

The invention claimed is:

1. A system for reducing or controlling marine growth on underwater portions of marine vessels hulls and vibratory sensitive underwater structures comprising:

a computer processor coupled to a memory store, said processor and memory digitally generating disruptive, multi-frequency, interfering US waveform signals which are applied to a digital to analog converter to obtain analog signals;

a plurality of ultrasound (US) transducers inboard of said underwater portions of marine vessels and structures to which is supplied said analog signals;

such that each transducer of said plurality of US transducers generates disruptive, multi-frequency, interfering US waveforms at the same time through said underwater portions of marine vessels and structures.

2. The system for reducing or controlling marine growth as claimed in claim 1 wherein digital signals and said analog signals are complex waveform signals.

3. The system for reducing or controlling marine growth as claimed in claim 2 wherein said complex waveform signals are created by digitally generating disruptive, multi-frequency, interfering US waveform signals replicating a Bessel function.

4. The system for reducing or controlling marine growth as claimed in claim 1 wherein said processor creates said digitally disruptive, multi-frequency, interfering US waveform signals with a Bessel function stored in said memory.

5. The system for reducing or controlling marine growth as claimed in claim 1 wherein said plurality of US transducers are either circular membrane transducers or surface transducers.

* * * * *